United States Patent [19]

Zeltner et al.

[11] 4,244,149
[45] Jan. 13, 1981

[54] WATER DISTRIBUTING SOIL SUPPORT FOR PLANT CONTAINERS

[75] Inventors: Bernard Zeltner, Aix en Provence; Gaston Marmonnier, Marseille, both of France

[73] Assignee: Manufacture Provencale de Matieres Plastiques SA, Marseille, France

[21] Appl. No.: 51,726

[22] Filed: Jun. 25, 1979

[51] Int. Cl.³ .................................................. A01G 27/00
[52] U.S. Cl. ............................................. 47/81; 428/255
[58] Field of Search ................... 428/163, 167, 255; 47/79, 81

[56] References Cited

U.S. PATENT DOCUMENTS

| | | | |
|---|---|---|---|
| 3,106,043 | 10/1963 | Ferrand | 47/81 |
| 3,266,966 | 8/1966 | Patchell | 428/255 X |
| 3,482,567 | 12/1969 | Franklin | 428/255 X |
| 3,576,088 | 4/1971 | Arca | 47/81 |
| 3,762,984 | 10/1973 | Goldbeck | 428/255 X |
| 4,101,359 | 7/1978 | Failliot | 428/255 X |

FOREIGN PATENT DOCUMENTS 1264832  5/1961  France .......................................... 47/81

Primary Examiner—Robert E. Bagwill
Attorney, Agent, or Firm—Stevens, Davis, Miller & Mosher

[57] ABSTRACT

A soil support for a plant container having a water reservoir below the support in which water-absorbent fabric in the support carries water to the soil base from the reservoir. To provide uniform watering to the soil, the fabric is provided with pathways to distribute water as evenly as possible throughout the fabric. These pathways are defined by regions of non-absorbent fabric which channel the water along the absorbent pathways. In a practical construction, interstices in the fabric are blocked, as with injection moulded plastics, to make the non-absorbent regions. Also, a main absorbent pathway, which is separated from the soil, is provided along longitudinal edges of the fabric to encourage water flow along the whole length of fabric before the water is brought into soil contact.

12 Claims, 8 Drawing Figures

U.S. Patent  Jan. 13, 1981  Sheet 1 of 2  4,244,149
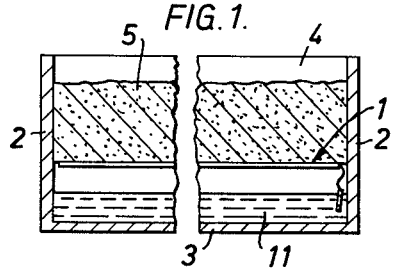
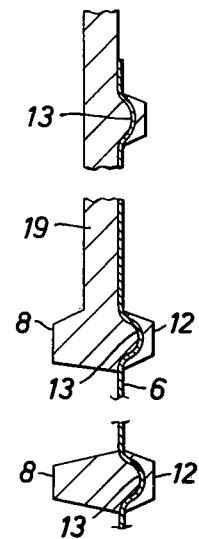
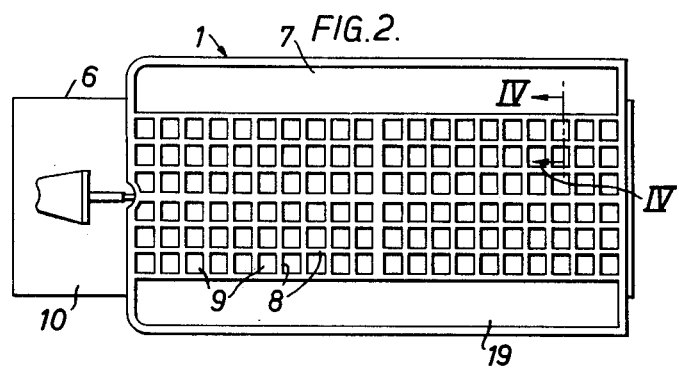
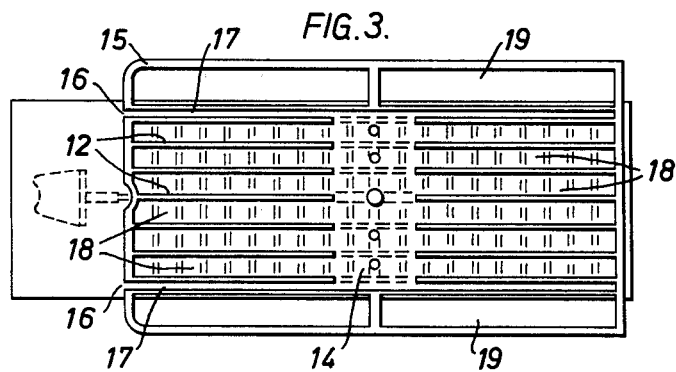

WATER DISTRIBUTING SOIL SUPPORT FOR PLANT CONTAINERS

This invention relates to water distributing soil supports for plant containers.

Plant containers are known which have a reservoir for water disposed above which is a soil support for supporting material such as particulate or humus plant holding materials. Materials of this kind will be referred to throughout this specification as "soil".

Suggestions have been made for the provision within or upon said supports of a water-absorbent fabric which contacts the soil and has a portion which hangs into water contained within the reservoir for the purpose of raising the water from the reservoir and into the soil by the absorbent action of the fabric. The intention of this construction is to avoid the need for constant rewatering as the fabric passes water into the soil and thence to plant roots through the soil base. Theoretically this is an ideal solution to the watering problem. However, it has been discovered that in practical application, the fabric absorbs water through its hanging portion and the part of the fabric closest to the hanging portion and contacting the soil becomes water saturated and in consequence saturates the adjacent soil. Fabric regions further away from the hanging portion are increasingly dryer with accompanying degrees of dryness in the adjacent soil and it is not unknown for regions of fabric remote from the hanging portion to be substantially dry. Hence, there is no uniformity in watering the soil with known constructions of soil support.

According to one aspect of the invention, a water distributing soil support has a fabric support structure and regions of the fabric which are rendered non-absorbent, these regions being relatively disposed to flank and, between them, define pathways of water-absorbent fabric. The pathways are defined as a main pathway in the fabric and at least one branch pathway extending from the main pathway at a position at least partly along the main pathway to control distribution of water throughout water-absorbent areas of the fabric.

The non-absorbent regions may be rendered non-absorbent by being treated with a water repellent substance such as a silicon, liquid rubber, or a tar or bitumastic material. However, the soil support may advantageously include a fabric retaining means which holds the fabric in afixed position relative to the support structure and in this case the fabric retaining means is preferably located at said regions of the fabric and provides the means rendering the fabric non-absorbent in these regions.

The fabric may be provided with a separate wick to feed water to the main pathway from a water reservoir, the separate wick projecting through the fabric and having a free end for immersion in the reservoir. For convenience of manufacture and also to provide a better product, the fabric is provided with an integral flexible end portion extending from the support structure for immersion in the reservoir.

Embodiments of the invention will now be described, by way of example, with reference to the accompanying drawings, in which:

FIG. 1 is a cross-sectional side elevational view of a plant container having a soil support according to a first embodiment;

FIG. 2 is a plan view of the soil support of FIG. 1;

FIG. 3 is an underside plan view of the soil support of FIG. 2;

FIG. 4 is a cross-sectional view of part of the soil support along line IV—IV of FIG. 2 and on a larger scale;

Figure 5:
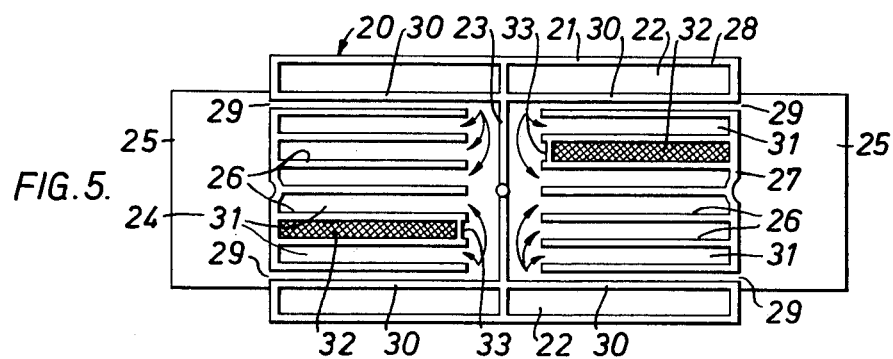
FIG. 5 is an underside plan view of a soil support according to a second embodiment.

In a first embodiment, as shown in FIG. 1, a soil support 1 is held between sides 2 of a plant container and disposed above a base 3 of the container and an open top 4. Soil 5 for holding plants is carried above the soil support.

As shown in FIG. 2, the soil support comprises a generally water-absorbent fabric layer 6 carried in a substantially planar condition by an injection moulded thermoplastics fabric support structure 7, the soil support being constructed in the manner described and claimed in a patent application filed concurrently herewith, applicant Bernard Zeltner et al, and entitled "Soil Support for Plant Containers".

As described in the aforementioned application, the support structure comprises fabric retaining means in the form of support members 8 which extend upwardly from the fabric layer; the members 8 lying spaced-apart longitudinally and laterally of the support structure to form cells 9. The members project into the soil 5 and serve to separate the lower regions of soil into spaces formed by the cells and resist tendency of the soil to form into a hardened mass.

The fabric layer 6 extends lengthways of the support structure so as to pass across each of the cells 9 and is provided with a flexible extension 10 which hangs downwardly in the container into water 11 for the purpose of absorbing the water and conveying it into the soil 5.

The layer 6 is held securely in position by the longitudinally disposed support members 8 which have lower portions 12 extending below the plane of the layer (FIGS. 3 and 4). As may be seen from FIG. 4, the fabric layer is deformed downwardly in regions 13 which are embedded in the longitudinal members 8. The assembly of structure 7 and layer 6 is made by a method described and claimed in the aforementioned application and results in the deformed regions 13 of the layer having its interstices filled with the thermoplastics material of the support members. The support members 7 thus provide means for rendering the fabric non-absorbent in the regions 13.

As may be seen from FIG. 3, the lower portions 12 of the longitudinal members 8 extend from each end of the structure 7 and are spaced-apart in central regions 14 of the soil support. Thus the deformed non-absorbent regions 13 of the layer 6 are spaced-apart and occupy the positions of the lower portions 12.

The fabric layer is also retained at the two ends of the structure by having two deformed non-absorbent regions embedded within a bead 15 which encircles the structure 7. A cross-sectional view of the bead with embedded deformed region is not shown but it is to be understood that it is substantially as shown in FIG. 4 for the embedded region 13 within a support member 8.

The bead extends downwardly below the plane of the fabric at the end of structure 7 adjacent the extension 10 for the whole width of the fabric layer except at the two edge portions of the layer where the fabric is not embedded in the thermoplastic material. At these portions, water-absorbent gaps 16 are provided in the fabric from extension 10 to absorbent fabric areas within the confines of the structure. Hence, as shown by FIG. 3, the non-absorbent regions embedded in the bead 15 and support members 7 flank and between them define pathways of water-absorbent fabric. These pathways comprise two main pathways 17 one along each edge of the fabric layer from the extension 10 at the gaps 16 to the central regions 14, the main pathways then extending transversely from the edge across the central regions. Branch pathways 18 extend in both directions longitudinally from the central regions between the support members 8 and their lower portions 12, i.e. some pathways 18 extend towards the extension 10 and others away from it.

Importantly, the first part of each main pathway 17, i.e. that extending from its gap 16 along an edge of fabric, lies beneath and is concealed from the upper surface of the support by a narrow planar frame 19 (FIG. 4) extending outwardly from support members 8 to the bead 15. It is also important that the parts of the main pathways in the central regions 14 and the branch pathways 18 extend across the cells 9 so as to be exposed at the upper side of the soil support.

In use of the support in the containers, water is absorbed up the fabric extension 10. Upon reaching the part of the fabric layer within the confines of the structure 7, its distribution is controlled throughout the layer instead of merely soaking directly into soil adjacent the extension 10 with dryer areas of soil in more remote areas. The water flows automatically through the two gaps 16 as it is prevented from being absorbed into the remainder of the fabric by passage across the full width of fabric at the bead 9 where the fabric is non-absorbent. From gaps 16, the water is absorbed along the main pathways 17 beneath the frames 19 and cannot be absorbed into the soil at this location because the pathways 17 are out of direct contact with the soil. Upon reaching the central regions 14, water is absorbed across these regions and then along the branch pathways 18 all of which are in contact with the soil. The result is, therefore, that the water is first brought into contact with the soil from both edges of the fabric and centrally of the container and is then distributed outwardly along pathways 18 into the soil.

Thus, the soil support of the above embodiment controls the distribution of water to make such distribution more uniform throughout the soil than is possible with conventional supports.

If, in the use of the above soil support, the water level drops in the container below the level of the fabric extension 10, then the fabric layer extending through the structure 7 is able to absorb water which has evaporated from the water reservoir and then condensed upon the fabric. Because of the use of the support members 8, a sufficiently strong soil-supporting structure is obtained while providing a large area of the cells 9 for transfer of water to the soil from the layer 6.

In a second embodiment shown in FIG. 5, a soil support 20 is of similar construction to that of the first embodiment in that a fabric support structure 21 has two narrow frames 22 flanking an area of horizontal and lateral support members (not shown). The second embodiment differs basically in that the structure 21 has a centrally positioned laterally extending support member with a lower portion 23 extending below the level of a fabric layer 24 held by the structure. A deformed region (not shown) of fabric is embedded in this support member to render the region non-absorbent in a manner similar to that described in the first embodiment. To distribute water throughout the fabric layer, it is provided with an extension 25 at each end for hanging into a water reservoir. Lower portions 26 of longitudinal support members and lower portions 27 of a surrounding bead 28 show in FIG. 5 the positions of deformed non-absorbent fabric regions which between them form gaps 29 to the rest of the fabric layer from the extensions 25, main pathways 30 up to the central support member and laterally across the layer at that support member, and branch pathways 31 extending longitudinally towards an extension 25.

One absorbent area 32 of the fabric layer on each side of the central support member is closed to the transfer of water from surrounding fabric as it is surrounded by a continuous non-absorbent fabric region in the bead, two adjacent support members with lower portions 26 and a closing lateral support member 33 which is moulded through the fabric and joins the two adjacent support members.

In use, the soil support of the second embodiment operates in a manner similar to that in the first except that each extension 25 feeds water to its own part of the fabric layer. Each area 32 is not fed with water and operates to allow air to pass through the fabric to aerate the soil in bands directly above these areas.

Figure 6:
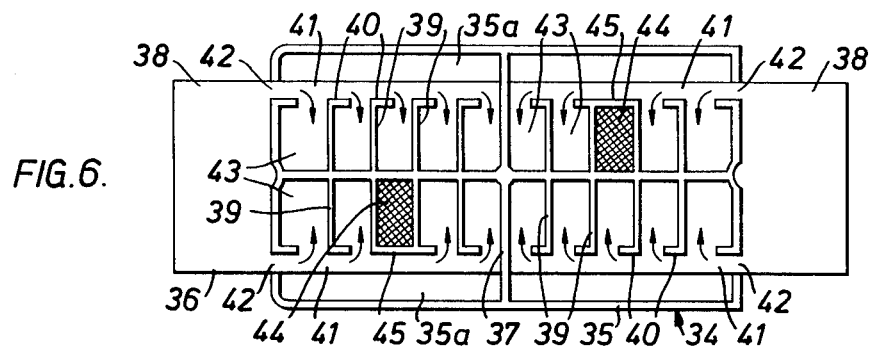
FIG. 6 is an underside plan view of a soil support according to a third embodiment.

In a third embodiment (FIG. 6), a soil support 34 has a support structure 35 carrying a fabric layer 36. A centrally positioned lateral support member with a lower portion 37 separates the fabric layer into two absorbent sections each provided with its own hanging extension 38.

In this embodiment, the deformed non-absorbent regions of fabric are provided mainly by certain parts of the lateral support members which have lower portions 39. Portions of certain longitudinal support members have short lower portions 40 and continue the non-absorbent regions.

The result of this is that main pathways 41 extend along the fabric edges from gaps 42 to the extensions 38 and branch pathways 43 are disposed in series along each main pathway and extend transversely thereto and to the fabric layer. Water is absorbed, therefore, into all the branch pathways as the main pathways are completely beneath narrow frames 35a of the support structure and water will flow all along the main pathways without passing directly into the soil.

In this embodiment, an area 44 of fabric on each side of the central support member is closed to transfer of water by one longitudinal support member 45 extending between adjacent lateral support members to provide a continuous region of non-absorbent fabric material around the area. This area operates to aerate the soil in a manner similar to that provided by the areas 32 in the second embodiment.

Figure 7:
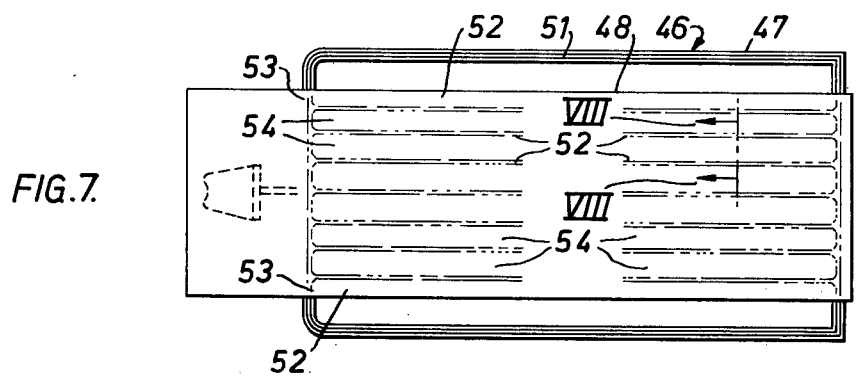
FIG. 7 is an underside plan view of a soil support according to a fourth embodiment.
Figure 8:
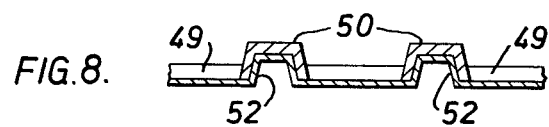
FIG. 8 is a cross-sectional view of part of the soil support of FIG. 7 along line VIII—VIII and on a larger scale.

In a fourth embodiment shown in FIGS. 7 and 8, a soil support 46 has a support structure 47 carrying a fabric layer 48. In this embodiment, the fabric layer is retained against the structure in a different fashion. As shown in FIG. 8, lateral support members 49 extend between deeper longitudinal support members 50, which, except for portions intermediate their length, are of inverted 'U' shape. A surrounding bead 51 is also of inverted 'U' shape.

Deformed non-absorbent regions 52 of the fabric layer are held in contact with grooves formed in the 'U' shaped support members and bead by adhesive which blocks the interstices in the fabric. The assembly of the soil support is made in a manner described and claimed in the aforementioned application.

As shown in FIG. 7, non-absorbent regions 52 of fabric are of substantially the same pattern as those produced in the first embodiment (FIG. 3) and provide main pathways 52 extending from gaps 53 and leading to branch pathways 54 extending longitudinally of the structure.

What is claimed is:

1. A water distributing soil support for a plant container comprising a layer of water-absorbent fabric and a fabric support structure carrying the fabric, the fabric having regions including means which renders the fabric non-absorbent, the regions being relatively disposed to flank and, between them, define pathways of water-absorbent fabric, said pathways being defined as a main pathway in the fabric and at least one branch pathway extending from the main pathway in a position at least partly along the main pathway to control distribution of water throughout water-absorbent areas of the fabric.

2. A support according to claim 1 wherein the support structure has a fabric retaining means which hold said regions of the fabric in a fixed position to the support structure, the retaining means providing the means rendering the fabric non-absorbent in said regions.

3. A support according to claim 2 wherein the fabric has at least one integral flexible end portion extending from the support structure for immersion of the end portion in a water reservoir, and the retaining means are disposed to locate said regions of fabric in positions to define the main pathway extending from the end portion into the fabric lying within the confines of the support, the pathway being narrow compared to the width of the end portion.

4. A support according to claim 3 wherein the retaining means are disposed to locate said regions of fabric in positions to define the main pathway in a position in which a first part of its length from the flexible end portion is concealed on one side of the fabric by the support structure so as to prevent direct contact with the soil by said first part of the pathway when the support is disposed in a container, and the at least one branch pathway is exposed on said one side of the fabric by the support structure.

5. A support according to claim 4 wherein the retaining means are disposed to locate said regions of fabric in positions to define a plurality of branch pathways relatively located in series along the main pathway and extending transversely thereto.

6. A support according to claim 5 wherein the main pathway extends longitudinally of the fabric from the flexible end portion and the branch pathways extend transversely of the length of the fabric.

7. A support according to claim 5 wherein the main pathway has its first part extending longitudinally of the length of the fabric and a second part extending transversely of said length, and the branch pathways extend longitudinally of said fabric from the second part of the pathway, some at least of the branch pathways extending from the second part of the pathway towards the flexible end portion.

8. A support according to claim 2 wherein the fabric retaining means comprise a plurality of fabric support members which are disposed in spaced relationship, the support members being formed from thermoplastics material with the fabric being at least partly embedded within the thermoplastics material in said regions to render the embedded fabric non-absorbent.

9. A support according to claim 2 wherein the fabric retaining means comprise a plurality of fabric support members which are disposed in spaced relationship, the fabric being held to the support members by adhesive which occupies interstices in the fabric to render it non-absorbent.

10. A support according to claim 2 wherein the retaining means are disposed in a continuous region of the fabric which surrounds an area of fabric exposed to a side of the support for direct contact with soil in the container, and non-absorbent fabric in said continuous region prevents water from flowing into said area of fabric.

11. A support according to any of claims 8 and 9 wherein the support members extend from one surface of the support so as to project upwardly into soil when the support is disposed within a container.

12. A plant container having a base wall and an open top and comprising a water distributing soil support according to claim 2 disposed in a substantially horizontal position within the container and spaced above the base of the container and below the top of the container, the retaining means of the support comprising a plurality of fabric support members which are disposed in spaced relationship and which project upwardly from the support so as to extend into soil when this is carried upon the support.

* * * * *